United States Patent [19]

Moore, Jr.

[11] E Patent Number: Re. 31,801

[45] Reissued Date of Patent: Jan. 15, 1985

[54] UREA-FORMALDEHYDE SOLUTION FOR FOLIAR FERTILIZATION

[75] Inventor: William P. Moore, Jr., Hopewell, Va.

[73] Assignee: Hawkeye Chemical Company, Clinton, Iowa

[21] Appl. No.: 441,953

[22] Filed: Nov. 15, 1982

Related U.S. Patent Documents

Reissue of:

[64] Patent No.: 4,244,727
Issued: Jan. 13, 1981
Appl. No.: 10,115
Filed: Feb. 7, 1979

[51] Int. Cl.[3] ..... C05B 15/00

[52] U.S. Cl. ..... 71/29; 71/64.1; 528/256

[58] Field of Search ..... 71/28–30, 71/64.10

[56] References Cited

U.S. PATENT DOCUMENTS

| | | | |
|---|---|---|---|
| 2,467,212 | 4/1949 | Kvalnes | 528/256 |
| 3,235,370 | 2/1966 | Kealy | 71/64.1 X |
| 3,462,256 | 8/1969 | Justice | 71/28 |
| 3,649,598 | 3/1972 | Namioka et al. | 71/28 X |
| 3,677,736 | 7/1972 | Formaini | 71/64.1 X |
| 3,918,952 | 11/1975 | Neumiller | 71/64.1 X |
| 4,033,745 | 7/1977 | Moore | 71/28 |

OTHER PUBLICATIONS

Powell, Urea Process Technology, Noyes Development Corp., Park Ridge, N.J., 1968, pp. 284–287.

Liquid Fertilizer Manual, NFSA, Peoria, Ill., 1967, pp. 17–1, 17–5, 17–6, 17–4.

*Primary Examiner*—Ferris H. Lander

*Attorney, Agent, or Firm*—Shapiro and Shapiro

[57] ABSTRACT

A clear, storable, aqueous solution of partially condensed urea and formaldehyde substantially free of formic acid supplies non-burning and slow-releasing plant food nitrogen when applied directly to the foliage of living grasses, and agricultural and ornamental plants or to soils having neutral or acid surfaces. The substantially ammonia free solution has a pH between 7.5 and 9.8 and contains added buffering agents so that between 0.05 and 0.30 milliequivalents of phosphoric acid are required to reduce pH of one gram to 7.0; and is prepared by the partial condensation of from 1.5 to 2.0 mols urea with 1.0 mol formaldehyde for 20 to 300 minutes at temperatures between 75° and 90° C. with between 0.05 and 0.3 milliequivalents of alkali hydroxide per gram of solution as catalyst.

16 Claims, No Drawings

UREA-FORMALDEHYDE SOLUTION FOR FOLIAR FERTILIZATION

Matter enclosed in heavy brackets [ ] appears in the original patent but forms no part of this reissue specification; matter printed in italics indicates the additions made by reissue.

BACKGROUND OF THE INVENTION

This invention relates to a new clear solution of plant nutrients for direct application to the foliage of living plants. More particularly, it relates to the composition of and a method for the production of a new clear liquid solution of partially condensed urea and formaldehyde, substantially free of formic acid, which may be stored as a clear solution for extended periods of time under ordinary commercial fertilizer storage conditions, and which remain sufficiently reactive to allow its partially condensed urea-formaldehyde content to react further to produce slow-releasing or water-insoluble nitrogen when applied directly to the neutral or acid surfaces of living plants or soil.

Liquid fertilizers have been used in commercial agriculture for many years to obtain accuracy and convenience of application and the economics and ease of handling and storage. Recently, foliar feeding of plants has been demonstrated to be a method for providing plant nutrients with increased efficiency. Foliar feeding has been effective with grasses, legumes, fruit trees, vegetables, ornamental plants and many other types of plants.

The prior art contains numerous uses of condensed urea and formaldehyde to provide slow-releasing and water insoluble nitrogen nutrients for fertilization of living plants. These slow-releasing nitrogen fertilizers have usually been solid products which have relatively low nitrogen availabilities for use by the plants. That is, about one-half or more, of the water insoluble nitrogen never becomes available to the plants to which it is applied. Solid fertilizer products are not physically suitable for application directly to the foliage of living plants.

The prior art describes a process which will produce urea-formaldehyde concentrates, high in urea content, comprising aqueous suspensions which remain flowable mixtures for at least 30 days. Also described in the prior art is a process for producing a stable solution of urea and formaldehyde having a urea to formaldehyde ratio above 1 to 1 and containing up to 6% liquid or gaseous ammonia added to the heated urea formaldehyde reaction. These high urea formaldehyde suspensions and concentrates are primarily designed for further reaction under conditions of elevated temperature and strong acid catalysts to produce solid fertilizers, and secondarily to provide urea-formaldehyde based fertilizer solutions.

Urea-formaldehyde concentrate solutions containing substantial amounts of ammonia, while storage stable, are undesirable as foliar feeds, because free ammonia applied to the foliage of living plants causes burning and leaf damage which may actually kill the treated plant. Further, ammonia reacts with the ends of low molecular weight urea-formaldehyde compounds, causing them to become resistant to further condensation reaction. To achieve slow-releasing nitrogen on the foliage or soil surfaces, further condensation of highly active urea-formaldehyde compounds is required.

The art has recently provided products, and processes for producing them, which are aqueous suspensions of water insoluble organic polymers, including urea-formaldehyde polymers, which may be effectively applied to the foliage of plants to supply slow-releasing, water-insoluble plant food nitrogen. Although these materials are agronomically effective, the suspensions cause handling difficulties from sediment in storage tanks and clogging of pipes and valves. Pluggage of application nozzles and inaccurate distribution through these nozzles is a particularly bad problem with these suspensions.

Relatively large amounts of strongly basic materials, such as alkali hydroxides, have been used as catalysts in the prior art urea-formaldehyde preparation reactions at temperatures as high as 100° C. or more. These drastic reaction conditions cause significant hydrolysis of formaldehyde to formic acid and formate salts. Formic acid and formate salts can cause severe foliage damage when applied directly to a plant and formic acid formation is a waste of formaldehyde raw material. Neutralization of excess formic acid with base material to provide storage stability of the concentrate creates a large buffer. This buffer can be large enough that it is not overcome on the surface of the treated foliage or soil and this further condensation of the urea-formaldehyde, which requires neutral or acid conditions, does not proceed at a speed needed to make the nitrogen slow-releasing.

There has been no disclosure of a storage-stable, clear liquid, partially condensed, urea-formaldehyde fertilizer solution which is sufficiently reactive to allow the urea-formaldehyde condensation to again commence to form slow-releasing and water-insoluble nitrogen when applied to the neutral or acid foliage of living plants or the soil, thereby effectively providing nitrogen which is released to the plant throughout an extended period of time without the hazard of damage to the plant.

It is a primary object of this invention to provide a clear, stable, and storable liquid solution of plant nutrients, substantially free of formic acid, comprising partially condensed urea, and formaldehyde, partially neutralized alkali hydroxides, and water, which may be safely and efficaciously applied directly to the foliage of living plants.

It is a further object of this invention to provide a clear aqueous solution for providing plant food nitrogen in a non-burning form directly to the foliage of living plants.

It is a further object to provide a clear aqueous solution of water soluble plant food nitrogen which forms water insoluble plant food nitrogen without further treatment when it is applied to the neutral or acid surfaces of plant foliage or soil.

It is a further object to provide a clear aqueous solution of water soluble plant food nitrogen which may be blended with other water soluble plant nutrients to form complete liquid fertilizers and form water insoluble plant food nitrogen when the mixed solution is applied to neutral or acid surfaces of plant foliage or the soil.

It is a further object to provide clear, stable, and storable liquid foliar fertilizer solution suitable for direct application to the foliage of living plants without the hazard of foliage damage.

It is a further object of this invention to provide a method for preparing a clear, stable, and storable solution which provides non-burning plant food nitrogen when applied directly to the foliage of living plants.

It is a further object to provide a method for preparing a clear, stable, storable solution of plant food nitrogen which forms water insoluble plant food nitrogen when applied to acid or neutral plant foliage or soil surfaces.

It is a further object to provide a method for preparing a clear, stable, and storable complete liquid fertilizer solution substantially free of formic acid and which forms water insoluble nitrogen without further treatment after application to the foliage of living plants.

It is a further object to provide an improved method for supplying water insoluble plant food to the foliage of grasses, and agricultural and ornamental plants, having acid or near-neutral surfaces.

Other objects and advantages will become evident to those skilled in the art from the following summary of my invention.

SUMMARY OF THE INVENTION

These and other objects are accomplished by a solution composed of partially condensed urea-formaldehyde substantially free of formic acid, having a pH between 7.5 and 9.8, preferably between 8.0 and 9.0, containing salts of alkali hydroxides having a closely controlled buffer capacity, so that between about 0.05 and 0.30 milliequivalents of phosphoric acid, preferably between 0.1 and 0.2, are required to decrease the pH of one gram of the solution to 7.0.

I have discovered that these solutions are surprisingly stable for periods of at least 3 months, under ordinary fertilizer solution storage conditions when they contain no more than 80% by weight solids, and between about 0.1 and 0.3 milliequivalents of alkali metal hydroxide per gram of solution. Further, it is necessary that the partial condensation of 1.5 to 2.0 mols of urea to 1 mol of formaldehyde be achieved under the mild reaction conditions of 75° to 90° C. reaction temperature, preferably 80° to 87° C., and 20 to 300 minutes reaction time, preferably 30 to 240 minutes. Lower reaction temperatures and alkali hydroxide concentrations, although eventually producing an acceptable urea-formaldehyde solution, reduce the condensation reaction rate so significantly that the reaction times required are too long to be commercially practical. Aqueous urea-formaldehyde concentrates prepared with temperatures above 90° C., and/or with alkali metal concentrations above 0.3 milliequivalents per gram are condensed beyond the optimum point for use as the liquid nitrogen source of this invention, having viscosities which usually range from about 80 to 400 centipoise causing difficulties in storage and application. Formic acid is rapidly formed by hydrolysis of formaldehyde under the drastic conditions of temperatures above 90° C. and alkali metal hydroxide concentrations above 0.3 milliequivalents per gram of solution. Formic acid formed must be neutralized with additional alkali hydroxide to prevent acid catalyzed polymerization of the solution. It thereby creates a large buffer which prevents formation of water insoluble nitrogen condensates when the solution is applied to a neutral or mildly acid surface. It has been found that formic acid is also phytotoxic to the foliage of living plants and must be substantially prevented from contacting plant foliage. Although relatively large amounts of buffering agents may be used in the preparation of the urea-formaldehyde concentrates of commerce which are subsequently reacted under conditions of elevated temperature and added mineral acids to produce solid fertilizer containing water insoluble nitrogen, the presence of large amounts of buffering agents prevent the formation of water insoluble nitrogen at a practical rate when the concentrate is applied directly to plant foliage or the soil under neutral or slightly acid conditions.

Urea raw materials used to prepared urea-formaldehyde concentrates frequently contain free ammonia and ammonia is sometimes added during the urea-formaldehyde condensation reaction to stabilize the intermediate urea-formaldehyde concentrate. Also, drastic reaction conditions including temperatures above 90° C. and high alkali hydroxide concentrations break urea down to ammonia and carbon dioxide. I have found that the ability of ammonia to end the chains of urea-formaldehyde polymers stabilizes the condensate so that formation of water insoluble nitrogen is ineffective when the condensate solution is applied to a neutral or slightly acid surface such as plant foliage. Free ammonia causes burning when applied directly to the foliage of plants.

I have found that formic acid in amounts only up to about 0.5% by weight of the foliar fertilizer may be tolerated on the foliage of plants without hazard or damage. Thus, it is necessary to prevent its formation in the condensation reaction. Commercial formaldehyde contains up to 3% formic acid and must usually be treated by ion exchange resins or other methods before it may be used to produce a foliar feed solution having 3 months or more storage stability and having the ability to form slow-releasing nitrogen condensates when applied to the neutral or acid surfaces of plant foliage or the soil.

Total solids concentrations higher than 80 percent by weight were found to be viscous and unsuited for effective spray application, as were solutions containing appreciably more than 30 percent nitrogen. Solutions containing less than 10 percent nitrogen are undesirable from the standpoint of economics. That is, shipping costs per unit of nitrogen become prohibitively high.

The solution of partially condensed urea-formaldehyde of this invention may contain other soluble plant nutrients required to produce a complete plant food solution. Soluble potassium and phosphate salts and secondary and micronutrients may be included as parts of the solution of this invention. The complete fertilizer solutions are storable for at least 3 months and form water-insoluble nitrogen when applied to neutral or acid surfaces of living plant foliage or to soils. To achieve these properties, the complete fertilizer compositions must be held within the same ranges as the solution containing only nitrogen, including, pH between 7.5 and 9.8 and solution buffer capacity preferably between 0.1 and 0.2 milliequivalents of phosphoric acid required to bring one gram of the solution to pH 7.0. In the complete nutrient solutions of this invention only the nitrogen is released slowly on the foliage. The other nutrients, for example, the soluble phosphates and potassium, behave in their normal manner. To produce a completely soluble, storable solution which is safe to apply to plant foliage and yet high enough in concentration to be commercially practical, the amounts of phosphorous must be held between 1 and 15% by weight, as $P_2O_5$, and potassium held between 1 and 10% by weight $K_2O$.

The sources of phosphate and potassium and other plant nutrients included in the solution of this invention may be commercially available soluble fertilizer materials which do not change the solution properties so they are outside the pH and buffer capacity requirements. Phosphates found to be particularly effective include, potassium phosphate, and ammonium polyphosphate; and potassium compounds include, potassium sulfate, and potassium phosphate. The complete fertilizer solutions may be produced by adding the required nutrients after the partially condensed urea-formaldehyde solution has been produced and cooled to ambient temperature. Addition of ammonium polyphosphate during the condensation reaction resulted in a product which did not form water insoluble nitrogen when it was applied to the foliage of a living plant.

A minimum amount of alkali hydroxide, in the range of 0.1 to 0.3 milliequivalents per gram, is used to catalyze the partial condensation of urea and formaldehyde at a useful rate and minimize conversion of formaldehyde to formic acid and formate salts. To produce a sufficient buffer capacity, in the range of 0.05 to 0.30 milliequivalents, preferably 0.1 to 0.2, phosphoric acid required to decrease the pH of one gram to pH 7, so the solution of this invention is storable for at least 3 months, it is usually necessary to add a small amount of buffering agent. The buffering agents may be added after the preparation of the partially condensed urea-formaldehyde solution is completed and cooled to room temperature. If a complete plant nutrient solution is prepared, the buffering agent is added after the mixture is completed.

The compositions of this invention may be prepared by simply mixing the required, separately prepared, ingredients, and maintaining the specified buffer capacity, pH, formic acid-formate and alkali hydroxide concentrations. Preferably, the specified composition is prepared from the commodity raw materials, urea, formaldehyde, and caustic, by dissolving an aqueous alkali hydroxide into aqueous urea solution, then adding aqueous formaldehyde to produce a reaction mixture containing between 1.5 and 2.0 mols urea to 1 mol formaldehyde and between 0.05 and 0.15 milliequivalents of alkali hydroxide per gram of solution, heating the mixture to 75° to 90° C., preferably 80° to 87° C., and maintaining the temperature for a period between 30 and 300 minutes while maintaining pH between 8.5 and 9.8, preferably between 9.0 and 9.7 by adding 0.15 or less additional milliequivalents of alkali hydroxide, until the viscosity of the partially condensed solution is between 10 and 60 centipoise at 25° C. The urea raw material must be substantially free of ammonia and the formaldehyde substantially free of formic acid. The partially condensed urea-formaldehyde solution is cooled to ambient temperature and the final pH is adjusted to between 7.5 and 9.8, preferably between 8.0 and 9.0, by adding a water soluble buffering agent. Buffering agents may be formed in the product by adding the required precursors and mixing, or may be added in the completed form, so long as they substantially hold pH constant throughout a 3 month storage period. I have found that during the storage of ureaformaldehyde concentrates, organic acids, primarily formic acid, are formed, which normally decrease pH and cause the undesirable precipitation of solids, but where a buffering agent is added in the narrow range herein specified, storability of solution can be obtained while retaining the high degree of polymerization activity, which allows formation of water insoluble nitrogen without addition of any materials when the solution is applied to the neutral or slightly acid surfaces of plant foliage or the soil.

The composition of this invention may be used to supply a highly reactive, yet storable, aqueous urea-formaldehyde solution for preparation of solid fertilizers, or resins. I prefer to use it in an improved method for supplying water insoluble plant food nitrogen to the foliage of grasses and agricultural and ornamental plants having acid or near neutral surfaces. The surfaces of the foliage of most plants have a slightly acid pH, ranging from about 5.0 to 7.5 pH. I have found that when the composition of this invention is sprayed on these surfaces, for example, lawn grasses and orange tree foliage, admixed with water to give a nitrogen concentration between 5 and 15% by weight at nitrogen rates between about 0.5 and 5.0 pounds of nitrogen per 1000 square feet of crop area at ambient temperatures, slow-releasing and water-insoluble plant food nitrogen is supplied to the plant over an extended period of time. No plant damage is produced in this improved method for feeding plants and the agronomic performance of the plants are clearly superior to those treated with equivalent amounts of solutions of inorganic plant foods.

For the purposes of this invention buffering agent is used to describe a chemical compound which tends to maintain a constant pH in a solution even when an acid is added or formed "in-situ". Buffer capacity here is used to express the capacity of the agent to resist pH change, and is expressed in terms of the amount of phosphoric acid, as milliequivalents, required to reduce the pH of one gram of solution to 7.0.

The expression urea-formaldehyde condensate used herein, indicates a mixture of compounds containing one molecule or more of each monomer. These compounds are primarily methylol ureas. Partially condensed urea-formaldehyde is used to indicate water soluble methylol urea compounds containing between 1 and 5 molecules of urea and formaldehyde in water solution having viscosities between 10 and 60 centipoise at 25° C.

Water Insoluble Nitrogen is defined by Official Methods of Analysis of the Association of Official Agricultural Chemists, (AOAC), tenth edition. Slow-releasing nitrogen is a term used here to define nitrogen which is released as usable plant food throughout an extended period of time and is not necessary water insoluble by the AOAC analysis.

DESCRIPTION OF THE PREFERRED EMBODIMENTS

The following examples illustrate the new, clear, stable, and storable liquid solution of plant food nitrogen, methods for its efficient preparation, and effective utilization of its slow releasing and water insoluble nitrogen which forms when it is applied directly, or in blended form, to the foliage of living plants.

EXAMPLE 1

This example demonstrates the method for preparing a clear, stable, and storable liquid solution of plant nutrients substantially free of formic acid, for direct application to foliage of living plants from urea, formaldehyde, and partially neutralized alkali hydroxides.

To a stirred, jacketed, stainless steel reactor containing cooling coils, and having a 4500 gallon capacity were added, in order, ingredients as follow:

| Ingredients | Amount, lbs |
|---|---|
| Water | 4.918 |
| Urea | 30.089 |
| Sodium Hydroxide, 50% Aqueous | 400 |

To these vigorously stirred ingredients was added aqueous formaldehyde which had been treated with ion exchange resin to remove formic acid and which had a pH of 5.2. The formaldehyde was added as follows:

| Ingredient | Amount, lbs |
|---|---|
| Formaldehyde, Aqueous 50% | 16.070 |

The combined ingredients were heated by application of steam to the reactor jacket while vigorous agitation was continued. The urea solids in the slurry decreased as heating proceeded until they were completely dissolved at 47° C. and a substantially clear solution was obtained. Heating was continued to bring the reaction temperature to 85° C. The pH of the reaction mixture was 9.8 at this point and reaction was exothermic. Cooling water, applied through the cooling coils, maintained the reaction temperature at 85° C. The reaction was continued for 50 minutes at 85° C. with samples withdrawn to check pH at 10 minute intervals. After each pH measurement, aqueous sodium hydroxide was added to the reaction mixture to bring the pH to 9.8, with the total amount added as follows:

| Ingredient | Amount, lbs |
|---|---|
| Sodium Hydroxide, Aqueous 50% by wt. | 400 |

After 50 minutes reaction time, free formaldehyde was less than 1%, as measured by the sodium sulfite method described in "Formaldehyde", Walker 2nd edition, p. 382, and viscosity was 28 centipoise. The alkali hydroxide used amounted to 0.19 milliequivalents per gram of solution, salt out temperature was found to be lower than −10° C., and cooling was started immediately After 60 minutes cooling, the temperature of the reaction mixture was nearly ambient at 31° C., and pH was 9.8. Small amounts of aqueous mixed monoammonium and diammonium phosphates were added with continued agitation to bring the pH to 8.5. Recovery of product solution was 52,600 pounds.

Analyses of the clear liquid solution of plant nutrients produced results as follows:

| | |
|---|---|
| U/F Mol Ratio | 1.87 |
| Salt Out Temperature | −22° C. |
| Total Nitrogen | 26.4% (wt) |
| Acid Buffer Capacity | 0.10 Milliequivalents $H_3PO_4$ to adjust pH of 1 gram to 7.0 |
| Total Formate Content as HCOOH | <0.5% |

EXAMPLE 2

This example demonstrates the method for preparing a clear liquid solution of plant food nitrogen by partially condensing urea and formaldehyde, in the presence of small amounts of alkali hydroxides, using reversed addition of urea and formaldehyde ingredients.

In the apparatus of Example 1, were added, in order, ingredients as follow:

| Ingredients | Amount, lbs |
|---|---|
| Water | 4.700 |
| Formaldehyde, 50% Aqueous pH 5.2 | 18.750 |
| Potassium Hydroxide, 45% Aqueous | 600 |

To these ingredients was added with heating and stirring the following ingredient:

| Ingredient | Amount, lbs |
|---|---|
| Urea, prills 46% Nitrogen | 30.000 |

The combined ingredients were heated to 48° C. where the mixture became a clear solution. Heating was continued to bring temperature to 83° C. The pH of the reaction mixture was 9.8 at this point and the reaction was mildly exothermic. Reaction was continued for 240 minutes with samples withdrawn to check pH at 20 minute intervals. Formation of by-product formic acid was minimized by the mild reaction conditions. After each measurement, pH was brought back to 9.8 by adding aqueous potassium hydroxide to the reaction mixture. The total amount of potassium hydroxide added was:

| Ingredient | Amount, lbs |
|---|---|
| Potassium Hydroxide, Aqueous 45% by wt | 340 |

After 240 minutes, the total potassium hydroxide added amounted to 0.14 equivalents per gram of solution and viscosity was 35 centipoise at 25° C. Free formaldehyde was found to be less than 1%, salt out temperature was less than −10° C., and cooling was started immediately. Formic acid and formate contents amounted to less than 0.5% (wt.). Near-ambient temperature of 30° C. was reached in 25 minutes. Small amounts of an aqueous solution of monopotassium and dipotassium phosphate were added to bring pH of the solution to 8.1. Recovery of clear product was 54,000 pounds. Analyses of the clear liquid product solution were as follows:

| | |
|---|---|
| U/F Mol Ratio | 1.6 |
| Acid Buffer Capacity | 0.12 |
| Total Nitrogen Content | 25.6% by weight |
| Salt Out Temperature | −20° C. |

EXAMPLE 3

This example demonstrates the conversion of premixed unreacted ingredients to a partially condensed and reactive, clear urea formaldehyde solution for direct application to foliage.

To a steel tank equipped with heating coils and agitator was added, in listed order, the following ingredients:

| Ingredients | Amount, lbs |
|---|---|
| Formaldehyde, Aqueous 50%, pH 5.5 | 32.000 |
| Water | 9.800 |
| Sodium Hydroxide, 50% Aqueous | 1.000 |

-continued

| Ingredients | Amount, lbs |
|---|---|
| Urea, Prills 46% Nitrogen | 61.000 |

The combined ingredients were heated, forming a substantially clear solution at 46° C. Heating was continued to 53° C. where the temperature was maintained. The combined ingredients were stored at 53° C. in the ingredient tank for subsequent reaction.

After 3 days storage, a sample was withdrawn and solids began to salt out at 44° C. and pH of the mixture was 9.7. These measurements indicate that little reaction had occurred in the ingredient mixture. The ingredients were then used to form partially condensed, reactive, urea-formaldehyde foliar feed solution.

A total of 52,000 pounds of the ingredients was pumped to an agitated reactor and held at 90° C. for a period of 35 minutes, with samples withdrawn at 5 minute intervals. After each pH measurement, aqueous sodium hydroxide was added to the reaction mixture to bring the pH back to 9.7. The total amount added was:

| Ingredient | Amount, lbs |
|---|---|
| Sodium Hydroxide, Aqueous 50% by wt. | 700 |

After 35 minutes, the total amount of sodium hydroxide added amounted to 0.29 milliequivalents per gram of solution, and viscosity was 38 centipoise. Free formaldehyde was found to be less than 1%, salt out temperature was less than −10° C., and total formic acid and formates as formic acid totalled less than 0.5% by weight. Cooling was started and temperature of the reaction mixture was nearly ambient at 33° C. in 40 minutes, and pH was 9.7. Small amounts of triethanolamine and phosphoric acid were added to the mixture with continued agitation to form ethanolamine phosphate in solution and buffer the pH at 8.4. The weight of recovered product solution was 52,000 pounds. Analyses of the product were as follows:

| | |
|---|---|
| U/F ratio | 1.91 |
| Acid buffer capacity | 0.13 |
| Total nitrogen content | 26.3 |
| Salt out temperature | −22° C. |

EXAMPLE 4

This example demonstrates the stability and storability of the partially condensed urea-formaldehyde solution of plant nutrients.

Product of Example 1 was placed in storage in mild steel tanks and maintained at ambient outdoor temperatures varying from 26° to −15° C. for a period of 3 months, and tested for clarity, viscosity, salt out temperature, and pH. Analytical results obtained at the end of the test period were as follows:

| | |
|---|---|
| Clarity, | Clear |
| Salt Out Temperature, | −20° C. |
| Viscosity, | 40 centipoise |
| pH, | 8.4 |

EXAMPLE 5

This example demonstrates the lack of stability and storability of the solution having inadequate buffer capacity.

A sample was withdrawn from the preparation of Example 1 after cooling the final product and prior to adding the ammonium phosphate solution. This sample had an initial pH of 9.8, and after storage in the same manner as Example 4, test results were obtained as follows:

| | |
|---|---|
| Clarity, | Precipitated |
| Salt Out Temperature, | Ambient Temperature |
| Viscosity, | Semi-solid |
| pH, | 7.2 |

EXAMPLE 6

This example demonstrates the production of storable mixed fertilizer solutions from partially condensed urea-formaldehyde solutions.

To the clear product from Example 2 was added potassium phosphate solution analyzing 0% nitrogen-15% phosphorous, as $P_2O_5$-15% potassium, as $K_2O$, and water, to produce a clear solution analyzing 10% N-3% $P_2O_5$- % $K_2O$ buffered to a pH of 8.5 by addition of ammonium formate. The solution was placed in ambient temperature storage for 3 months and remained clear and substantially unchanged at the end of the test period.

Another sample was made at pH 7.3, and precipitated water insoluble nitrogen from solution after only 2 days storage.

EXAMPLE 7

This example demonstrates the non-burning character of the partially condensed urea-formaldehyde solutions.

Squares of one year old, thickly growing Kentucky-31 tall fescue grass turf were dug and carefully placed in 6 separate well drained aluminum flats, all of which had sides each 10 inches long and a depth of 2½ inches. These turf samples were watered heavily and given no plant food for a period of 30 days, while height of the grass was carefully maintained at 3 inches above the soil, by clipping, in a greenhouse maintained at temperature of about 20° C.

Starting with all flats evenly cut to a 3 inch height, test materials were applied to the foliage evenly with a fine laboratory spray, as folows: flats 1 and 2 received no fertilizer; flats 3 and 4 received 1.50 pounds of nitrogen per 1000 square feet of turf area with the nitrogen derived solely from the product solution of Example 6; and flats 5 and 6 received 1.50 pounds of nitrogen per 1000 square feet with the nitrogen derived solely from aqua ammonia. The flats were each given water two times per week.

No burning was found in flats 1, 2, 3, and 4. Burning was severe in flats 5 and 6. The color in flats 1 and 2 receiving no fertilizer was pale green and growth rate was very slow, but the grass in flats 3 and 4 was deep green in color and had a good growth rate. The good color continued after the 30 day test period was completed indicating that nitrogen from the foliage application was still being supplied to the plants. The grass in the untreated flats and the burned flats showed poor life signs after the 30 day test.

EXAMPLE 8

This example demonstrates the "in-situ" conversion of the soluble nitrogen contained in the partially condensed urea-formaldehyde of this invention to water insoluble nitrogen on the foliage of living plants having neutral or acid surfaces.

The product of Example 2 had pH of 8.1 and contained 25.6% by weight nitrogen, all of which was soluble. Acid buffer of this solution was 0.12. That is 0.12 milliequivalents of phosphoric acid were required to bring the pH of one gram of the solution down to 7.0.

Eight 10"×10"×2½" aluminum flats were prepared as in Example 7 containing thickly growing Kentucky-31 tall fescue. Clippings were made to bring the height of the grass foliage to 3 inches. The pH of the grass surfaces was measured by stripping 10 grams of the freshly cut clippings in 100 milliliters of distilled water and checking immediately with a freshly calibrated pH meter. The pH was found to be 6.2.

Product of Example 2 was applied as a finely divided spray to the foilage surface of flats 1 and 2 at a rate of 1.50 pounds of nitrogen per 100 square feed covered area. Product of Example 2 was diluted with distilled water to give a nitrogen concentration of 7% by weight and applied to flats 3 and 4 at the same 1.50 pounds of nitrogen per 1000 square feet as flats 1 and 2 received. Flats 5 and 6 were similarly treated with a finely divided aqueous spray containing 7% nitrogen in the form of urea solution.

The flats were stored under controlled conditions at 72°-75° F. and 40 to 45% relative humidity with natural sunshine coming through glass to the plants. Flats 7 and 8 received a similar application of water, containing no nitrogen. Moisture was applied directly to the soil of the flats every two days of the test which lasted 7 days. After 7 days the grass was harvested and recovered by cutting evenly one inch above the soil. The samples were immediately chopped so they could be conveniently handled and analyzed for water insoluble nitrogen content by the method of the Association of Official Agricultural Chemists (AOAC), tenth edition of Official Methods of Analysis. Total nitrogen content was also determined by the standard Kieldahl Method. Results obtained from each flat are tabulated below:

| Flat Number | 1 | 2 | 3 | 4 | 5 | 6 | 7 | 8 |
|---|---|---|---|---|---|---|---|---|
| Total N Recovery, grams/gram charged | .68 | .59 | .69 | .72 | .48 | .51 | — | — |
| Percent of N Fed Recovered as Water Insoluble | 21 | 17 | 24 | 25 | 2 | 1 | 2 | 2 |

Small amounts of WIN obtained in flats 5 through 8 were possibly derived from protein content of grasses.

I claim:

1. A process for preparing a storage-stable aqueous solution of a urea-formaldehyde partial condensation product adapted for the foliar feeding of plants which consists of:

providing an aqueous solution of an alkali metal hydroxide, urea and formaldehyde substantially free of formic acid, said solution having a urea to formaldehyde ratio of from 1.5 to 2.0, a nitrogen content between 10 and 30% and a pH between 8.5 and 9.8;

heating said aqueous solution at a temperature of from 75° C. to 90° C. for 20 to 300 minutes while continuously maintaining the pH thereof between 8.5 and 9.8 by the incremental addition of an alkali metal hydroxide until the reaction mixture exhibits a viscosity of from 10 to 60 centipose at 25° C.; and cooling said reaction mixture to ambient temperature and adjusting the pH to between 7.5 and 9.8 by the addition of a water soluble buffering agent in an amount to provide a buffering capacity requiring between 0.05 and 0.30 milliequivalents of phosphoric acid to lower the pH of one gram of the reaction mixture to 7.0.

2. The process in accordance with claim 1 wherein said alkali metal hydroxide is sodium hydroxide or potassium hydroxide.

3. The process in accordance with claim 2 wherein said buffering agent is selected from the group consisting of sodium phosphate, potassium phosphate, potassium formate, ammonium phosphate, ammonium formate, triethanolamine formate, ammonium carbonate, sodium bicarbonate, and triethanolamine phosphate.

4. The process in accordance with claim 3 wherein said reaction mixture is heated at a temperature of from 80°-87° C. and wherein the pH of the reaction mixture is maintained between 9.0 and 9.7.

5. The process in accordance with claim 4 wherein the pH of said cooled reaction mixture is adjusted to between 8.0 and 9.0 by the addition of ammonium phosphate in an amount to provide a buffering capacity requiring between about 0.1-0.2 milliequivalents of phosphoric acid to lower the pH one gram of the reaction mixture to 7.0.

6. The aqueous fertilizer composition prepared by the process of claim 1.

*7. A process for preparing a storage-stable aqueous plant food adapted for the foliar feeding of plants, consisting essentially of forming a solution of partially reacted urea-formaldehyde that is primarily methylol ureas by heating a reaction mixture of water, alkali metal hydroxide, urea and formaldehyde substantially free of formic acid to a temperature of from 75° C. to 90° C. and maintaining the temperature for 20 to 300 minutes while maintaining the pH of the reaction mixture between 8.5 and 9.8 and until the reaction mixture exhibits a viscosity of from 10 to 60 centipoise at 25° C., the amount of urea and formaldehyde in said solution being selected to provide a urea to formaldehyde ratio of from 1.5 to 2.0 and a nitrogen content not less than 10% and not appreciably more than 30% by weight, said solution being buffered to a pH between 7.5 and 9.8 by the addition of one or more water soluble buffering agents in an amount to provide a buffering capacity requiring between 0.05 and 0.30 milliequivalents of phosphoric acid to lower the pH of 1 gram of the solution to 7 and being sufficiently reactive to allow further urea-formaldehyde reaction to form effective amounts of slow-releasing water-insoluble plant food nitrogen, without requiring addition of any materials, when the solution is cooled to ambient temperature and is applied to the foliage of plants or to soil having a pH ranging from about 5.0 to 7.5.*

*8. A process in accordance with claim 7, wherein the amount of alkali metal hydroxide in the solution is between 0.1 and 0.3 milliequivalents of alkali metal hydroxide per gram of solution.*

*9. A process in accordance with claim 8, wherein the reaction mixture is initially provided with between 0.05 and 0.15 milliequivalents of alkali metal hydroxide per gram of*

*solution and said maintaining of the pH of the reaction mixture is accomplished by adding 0.15 or less additional milliequivalents of alkali metal hydroxide.*

*10. A process in accordance with claim 9, wherein said adding of alkali metal hydroxide is accomplished incrementally.*

*11. A process in accordance with claim 7, wherein the reaction mixture is heated to a temperature of from 80° to 87° C. and the pH is maintained between 9.0 and 9.7 during the maintenance of said temperature.*

*12. A process in accordance with claim 7, wherein said buffering capacity is between about 0.1 and 0.2 milliequivalents of phosphoric acid required to lower the pH of 1 gram of the solution to 7.*

*13. A clear, storage-stable, aqueous plant food solution comprising partially reacted urea and formaldehyde primarily as methylol ureas and with a ratio of between 1.5 and 2.0 mols urea per mol of formaldehyde, said solution having a nitrogen content not less than 10% and not appreciably more than 30% by weight and having a viscosity between 10 and 60 centipoise at 25° C., said solution being buffered to a pH between 7.5 and 9.8 by one or more buffering agents having a buffer capacity controlled so that between about 0.05 and 0.30 milliequivalents of phosphoric acid are required to decrease the pH of one gram of the solution to 7, and said solution being sufficiently reactive to allow further urea-formaldehyde reaction to form effective amounts of slow-releasing water-insoluble plant food nitrogen, without requiring addition of any materials, when the solution is applied to the foliage of plants or to soil having a pH ranging from about 5.0 to 7.5.*

*14. A plant food solution in accordance with claim 13, wherein said buffering agents are selected from the group consisting of sodium phosphate, potassium phosphate, potassium formate, ammonium phosphate, ammonium formate, triethanolamine formate, ammonium carbonate, sodium bicarbonate, and triethanolamine phosphate.*

*15. A plant food solution in accordance with claim 13, further comprising effective amounts of plant food potassium and phosphate.*

*16. An improved method for supplying nutrients to plants, said method comprising applying a plant food solution in accordance with claim 13 to the foliage of plants in concentrations and amounts required to produce desired plant growth rates.*

* * * * *